United States Patent Office 3,574,638
Patented Apr. 13, 1971

3,574,638
FRENCH FRIED PRODUCTS AND PROCESS FOR PREPARING
Albert Henry Nagel and Thomas Patrick Finucane, Hartsdale, N.Y., assignors to General Foods Corporation, White Plaines, N.Y.
No Drawing. Filed May 13, 1968, Ser. No. 728,756
Int. Cl. A23l 1/00; A22c 21/00, 25/00
U.S. Cl. 99—100                                19 Claims

ABSTRACT OF THE DISCLOSURE

A process of preparing French fried products comprising frying a food product in deep fat containing silica gel. The fried product may be frozen and reheated if desired.

BACKGROUND OF THE INVENTION

The present invention deals with a process of making French fried products intended for human consumption and nourishment. The French fried products include but are not limited to: fish, onion rings, potatoes, chicken, etc.

In the past silica gel has been used for preferential absorption, gelling acids, as desiccants, as inert carriers, for tabletting, gloss reduction in cosmetics and for oil and moisture removal in dusting or talcum powders, and in foods as anti-caking agents, however, the silica gel had to be added directly to the product to be treated in these instances. No use of silica gel in the process of French frying appears known in the art.

SUMMARY OF THE INVENTION

The present invention is directed to a process of preparing French fried products comprising frying the food product at temperatures of 350°–400° F. in deep fat containing less than 2% silica gel, having an average particle size of about 10 microns. Another embodiment comprises the subsequent steps of freezing the fried product at 0° to −70° F. A further embodiment comprises the step of reheating the frozen fried food product in an oven at 425° F. for 10 minutes.

This process requires a smaller quantity of silica gel than the process of adding the gel directly to the batter mix, and since the surface effect is of chief importance, incorporation of the silica gel in the frying oil provides a vehicle for depositing the silica gel on the surface of the fried product in a uniform manner, and at a location where the greatest benefit is desired. More specifically, the uniformly coated fried product of the present process prevents the exudation of fat from the outer surface of the fried product, and also retains the moisture in the interior of the fried product. As a result little intermingling of fat and moisture occur upon reheating, thereby lessening the sogginess and enhancing evenbrowning, without burning. The prevention of fat exudation upon reheating also eliminates fat drippings. Thus the prior art problems of off taste, sogginess, fat dripping and lack of even-browning, are eliminated in the French frying and reheating steps of the present invention.

Although the silica gel may be added directly to the batter mix prior to frying, a much larger quantity would have to be added. Moreover, the direct addition of silica gel to the batter mix gives a fried product which has an apparent tendency to get soggy upon reheating, and such sogginess impairs the crispness and taste of the reheated fried food product. Another disadvantage of directly adding silica gel to the batter mix is that it produces a fried product which drips off fat upon reheating.

It is a critical feature of the present invention that the silica gel used in the cooking oil be present in an amount less than 2% based on the oil, and have an average particle size of not more than about 10 microns.

The edible shortening fats or oils which may be employed may be liquid materials, semi-solid materials or those which are solid at room temperature, either natural or chemically produced such as by hydrogenation. The oils may be cottonseed oil, corn oil, peanut oil, sunflower or other edible oils; the semi-solid fats may be lard, butter, margarine or the like; the solid fats may be animal fats or they may be the liquid oils previously mentioned which have been hydrogenated, or mixtures thereof.

The term batter as used herein includes art known mixtures of flour or bread, salt, baking powder, eggs, and milk and/or water etc.

The following is a description of the preferred embodiment of the invention:

Example I

Micron size silica gel (Syloid 63) was added to liquid cottonseed oil at 1% levels. The oil was heated to 375° F. and battered and breaded fish was fried therein for a period of 40–120 seconds. The deep fried lightly brown product was removed from the frying oil and chilled at 0° to 70° F. to freeze the fish and solidify the fat. In general, the fat content of the piece produced will range from 6–10%. After chilling the product is generally packaged and distributed in the frozen condition, however here, it was reheated in an oven at 425° F. for 10 minutes to give a non-soggy, crisp, evenly browner, good tasting fried product.

Example II

Same as Example I using 2% level of silica gel (Syloid 63). The reheated product was more crisp than in Example I, but the taste was off-flavor.

Example III

Same as Example I using 1% level of silica gel (Syloid 65). The reheated product was a non-soggy, crisp, evenly browner, good tasting fried product.

Example IV

Same as Example III using 2% level of silica gel (Syloid 65). The reheated product was more crisp than in Example III, but the taste was off-flavor.

Example V

Same as Example I using 1% level of silica gel (Syloid 72). The reheated product was a non-soggy, crisp, evenly browner, good tasting fried product.

Example VI

Same as Example V using 2% level of silica gel (Syloid 72). Syloid 72 caused violent boiling of the oil when used at 2% levels and was therefore unsuitable at that range.

Example VII

Same as Example I using 1% level of silica gel (Syloid 74). The reheated product was a non-soggy, crisp, evenly browner, good tasting fried product.

Example VIII

Same as Example VII using 2% level of silica gel (Syloid 74). Syloid 74 caused violent boiling of the oil when used at 2% levels and was therefore unsuitable at that range.

Example IX

Same as Example I using 1% blend of silica gel (Syloid 63 and Syloid 72). The reheated product was a non-soggy, crisp, evenly browner, good tasting fried product.

Example X

Same as Example IX using 2% level of a blend of silica gels (Syloid 63 and Syloid 72). These blends caused violent boiling of the oil when used at 2% levels and was therefore unsuitable at that range.

| Color | Average particle size | Surface m.²/g. area | Oil absorption, lbs./100 lbs. | pH 5% sol | Bulk, lbs./cu. ft. |
|---|---|---|---|---|---|
| Syloid 63 ...... White ... | 9–10 | 830 | 90 | 4.2 | 34 |
| Syloid 65 ........do.... | 4 | 830 | 90 | 4.2 | 20 |
| Syloid 72 ........do.... | 4 | 370 | 170 | 7.2 | 8 |
| Syloid 74 ........do.... | 9–10 | 370 | 170 | 7.2 | 16 |

The Syloid 74 was considered to give the best results both from the standpoint of minimum fat exudation and also from the standpoint of crisp texture. Syloid 72 was second best followed by Syloid 65 and 63 in that order.

While the present invention has been described with particular reference to specific examples it is not to be limited thereby, but reference is to be had to the appended claims for a definiton of its scope.

What is claimed is:

1. A process for preparing a French fried food product comprising deep fat frying said food product at temperatures of 350°–450° F. in a fat containing an effective amount, but less than about 2% silica gel, said silica gel having an average particle size of not more than 10 microns.

2. A process as in claim 1 in which said food product is batter covered.

3. The process of claim 1 further comprising freezing said French fried food product at 0° to −70° F.

4. The process of claim 2 further comprising freezing said French fried food product at 0° to −70° F.

5. A process as in claim 3 in which said French fried product is reheated in an oven at 425° F. for 10 minutes.

6. A process as in claim 4 in which said French fried product is reheated in an oven at 425° F. for 10 minutes.

7. The process of claim 1 wherein the food product is potatoes.

8. The process of claim 2 wherein the batter covered food product is onions.

9. The process of claim 2 wherein the batter covered food product is fish.

10. The process of claim 2 wherein the batter covered food product is chicken.

11. A French fried food product resistant to fat exudation and having a coating of silica gel, said food product prepared by the process of claim 1.

12. A product as in claim 11 which is batter covered.

13. A product as in claim 11 which is frozen.

14. A product as in claim 12 which is frozen.

15. A product as in claim 11 in which the French fried product is potatoes.

16. A product as in claim 12 in which the French fried product is onions.

17. A product as in claim 12 in which the French fried product is fish.

18. A product as in claim 12 in which the French fried product is chicken.

19. A reheated French fried food product resistant to fat exudation and having a coating of silica gel, said French fried food product prepared by the process of claim 1.

References Cited

UNITED STATES PATENTS

| | | | |
|---|---|---|---|
| 2,703,288 | 3/1955 | Worson | 99—168 |
| 2,771,370 | 11/1956 | Allen | 99—100 |
| 2,874,055 | 2/1959 | Melnick | 99—100 |
| 2,984,572 | 5/1961 | Barsel | 99—168 |
| 3,052,545 | 9/1962 | Ducharme | 99—100 |
| 3,078,172 | 2/1963 | Libby | 99—100 |
| 3,127,271 | 3/1964 | Goulston | 99—100 |
| 3,397,065 | 8/1968 | Cunningham | 99—118 |
| 2,998,319 | 8/1961 | Babayan | 99—118 |

NORMAN YUDKOFF, Primary Examiner

M. G. MULLEN, Assistant Examiner

U.S. Cl. X.R.

99—107, 111, 118, 192